United States Patent
Fergadiotou et al.

(10) Patent No.: US 12,206,272 B2
(45) Date of Patent: Jan. 21, 2025

(54) ELECTRIC VEHICLE CHARGING DYNAMIC SCHEDULING

(71) Applicant: Inlecom Innovation Astiki mi Kerdoskopiki Etaireia, Athens (GR)

(72) Inventors: Ioanna Fergadiotou, Ntrafi-Pikermi (GR); Ibad Kureshi, Sepnnymoor (GB); Patrick J O'Sullivan, Dublin (IE); Dimitra Politaki, Athens (GR)

(73) Assignee: INLECOM INNOVATION ASTIKI MI KERDOSKOPIKI ETAIREIA, Athens (GR)

( * ) Notice: Subject to any disclaimer, the term of this patent is extended or adjusted under 35 U.S.C. 154(b) by 523 days.

(21) Appl. No.: 17/668,147

(22) Filed: Feb. 9, 2022

(65) Prior Publication Data

US 2022/0344957 A1 Oct. 27, 2022

(30) Foreign Application Priority Data

Apr. 23, 2021 (FR) ...................................... 2104240

(51) Int. Cl.
*H02J 7/00* (2006.01)
*B60L 53/30* (2019.01)
(Continued)

(52) U.S. Cl.
CPC .......... *H02J 7/0071* (2020.01); *B60L 53/305* (2019.02); *B60L 53/35* (2019.02); *B60L 53/62* (2019.02);
(Continued)

(58) Field of Classification Search
CPC .. H02J 7/0071; H02J 7/00032; H02J 7/00048; H02J 7/00712; B60L 53/67;
(Continued)

(56) References Cited

U.S. PATENT DOCUMENTS 9,170,118 B2 * 10/2015 Kiyama .................. B60L 53/65
9,851,213 B2 * 12/2017 Oh .......................... B60L 53/63
(Continued)

FOREIGN PATENT DOCUMENTS

DE    102010014291 A1 * 10/2011  .......... B60L 11/1846
DE    102018214986 A1 *  3/2020  ............ B60L 53/665
(Continued)

OTHER PUBLICATIONS

Feng et al., Chinese Patent Document No. CN-112638702-A, published Apr. 9, 2021, 4 pages including abstract. (Year: 2021).*
(Continued)

*Primary Examiner* — Phallaka Kik
(74) *Attorney, Agent, or Firm* — CRGO Global; Steven M. Greenberg

(57) ABSTRACT

Electric vehicle charging scheduling includes receiving repeated sensor readings of a battery of an electric vehicle, the readings monitoring a charge of the battery while the electric vehicle proceeds along a contemporaneously scheduled route. Then, a geolocation of the electric vehicle is determined and a database queried with the geolocation. A charging station is then identified within geographic proximity of the geolocation of the electric vehicle. As well, a route scheduled for the electric vehicle after the contemporaneously scheduled route is determined. Thereafter, a threshold charge is computed that is requisite to complete both the contemporaneously scheduled route and also at least a portion of the route scheduled after the contemporaneously scheduled route. Finally, in response to a determination that the monitored charge on the battery is below the threshold level, an alert is displayed indicating to charge the battery at the identified charging station.

15 Claims, 3 Drawing Sheets

(51) Int. Cl.
*B60L 53/35* (2019.01)
*B60L 53/62* (2019.01)
*B60L 53/66* (2019.01)
*B60L 53/67* (2019.01)
*B60L 58/12* (2019.01)
*G06Q 10/10* (2023.01)
*G06Q 10/1093* (2023.01)

(52) U.S. Cl.
CPC ............. *B60L 53/665* (2019.02); *B60L 53/67* (2019.02); *B60L 58/12* (2019.02); *G06Q 10/1097* (2013.01); *H02J 7/00032* (2020.01); *H02J 7/0048* (2020.01); *H02J 7/00712* (2020.01)

(58) Field of Classification Search
CPC ........ B60L 53/62; B60L 53/305; B60L 53/35; B60L 58/12; G06Q 10/1097
USPC .......................................... 320/109, 104, 112
See application file for complete search history.

(56) References Cited

U.S. PATENT DOCUMENTS

| | | |
|---|---|---|
| 2013/0261860 A1 | 10/2013 | Oyama |
| 2014/0052373 A1 | 2/2014 | Hoch |
| 2015/0158393 A1* | 6/2015 | Kawano ................. G06Q 10/04 320/109 |
| 2015/0286965 A1 | 10/2015 | Amano |
| 2015/0298565 A1* | 10/2015 | Iwamura ................. G06Q 10/04 701/22 |
| 2017/0176195 A1 | 6/2017 | Rajagopalan |
| 2018/0143029 A1* | 5/2018 | Nikulin .............. G01C 21/3415 |
| 2019/0275893 A1* | 9/2019 | Sham ...................... B60L 58/12 |
| 2020/0072627 A1* | 3/2020 | Jung ................. G01C 21/3679 |
| 2020/0117204 A1* | 4/2020 | Lindemann ............. B60L 53/63 |
| 2020/0386561 A1 | 12/2020 | Namiki |
| 2021/0065073 A1 | 3/2021 | Maeda |
| 2021/0221243 A1* | 7/2021 | Kawamoto ........... H01M 10/48 |
| 2022/0341744 A1* | 10/2022 | Zhang .................... G06Q 10/02 |

FOREIGN PATENT DOCUMENTS

| | | | | |
|---|---|---|---|---|
| EP | 2741052 A1 * | 6/2014 | .......... | B60L 11/1846 |
| KR | 1676689 B1 * | 11/2016 | .......... | B60L 11/1824 |
| WO | WO-2014027690 A1 * | 2/2014 | .............. | B60L 11/18 |
| WO | WO-2014033944 A1 * | 3/2014 | .......... | B60L 11/1838 |

OTHER PUBLICATIONS

Machine English Translation of German Patent Document No. DE-10-2010014291-A1, published on Jun. 10, 2011, machine tranlsated by PatentScope on Sep. 6, 2024, 3 pages. (Year: 2024).*

* cited by examiner

ELECTRIC VEHICLE CHARGING DYNAMIC SCHEDULING

CROSS-REFERENCE TO RELATED APPLICATIONS

This application claims priority under 35 U.S.C. § 119 (a) to French patent application FR2104240 filed on Apr. 23, 2021, the entire teachings of which are incorporated herein by reference.

BACKGROUND OF THE INVENTION

Field of the Invention

The present invention relates to the technical field of electric vehicle charging and more particularly, to vehicle range computation based upon a measured charge of an electric vehicle.

Description of the Related Art

An electric vehicle generally refers to a motor vehicle that uses one or more electric motors to propel a vehicle along a route. In most instances, an electric vehicle may be powered by a self-contained battery or array of batteries. To that end, batteries are essential to the operation of an electric vehicle. Electric vehicle batteries generally are charged by coupling the battery pack of an electric vehicle to an electric power source. After a period of time has elapsed, the batteries of the battery back will have become fully charged and ready to discharge in furtherance of powering a motor enabled to propel the vehicle along a route.

Just as in the case of a fossil fuel powered vehicle, an electrical vehicle can be characterized according to range. Range, in the context of an electric vehicle refers to the distance through which the electric vehicle is able to travel powered by an onboard battery or array of batteries from a full charge state of the battery or batteries to a discharged state of the batter or batteries. Of course, seldom would an operator consider fully discharging a battery while underway in an electric vehicle. Therefore, for some range may refer to the distance able to be traveled by an electric vehicle on a fully charged battery or battery pack before a threshold degree of charge remains indicating a necessity to recharge.

Managing the charge of an onboard battery or battery pack remains of paramount importance to an operator of an electric vehicle. As there are substantially fewer electric charging stations along the typical roadway than there are traditional petrol stations, upon encountering an electric charging station, an operator of an electric vehicle must always assess whether or not recharging of the onboard battery array is required. For the casual driver, so much is not of too much more consequence than is the case with a fossil fuel powered vehicle. But, for a commercial vehicle scheduled for a series of successive routes in advance in the course of a last mile logistics operation, the decision making can be more complex—especially when an operator of the commercial electric vehicle is unaware with the extent of a subsequently scheduled routing and the availability of electric charging stations along the subsequently scheduled routing.

BRIEF SUMMARY OF THE INVENTION

Embodiments of the present invention address technical deficiencies of the art in respect to electric vehicle charging. To that end, embodiments of the present invention provide for a novel and non-obvious method for electric vehicle charging scheduling in light of a future routing of the electric vehicle and the ability of a measured charge of the electric vehicle to permit the electric vehicle to complete a contemporaneous route and also at least a portion of a subsequently scheduled route. Embodiments of the present invention also provide for a novel and non-obvious computing device adapted to perform the foregoing method. Finally, embodiments of the present invention provide for a novel and non-obvious data processing system incorporating the foregoing device in order to perform the foregoing method.

In one embodiment of the invention, an electric vehicle charging scheduling method includes receiving over a communications channel in memory of a computing device, repeated sensor readings of a battery of an electric vehicle, the sensor readings monitoring a charge of the battery while the electric vehicle proceeds along a contemporaneously scheduled route. The method also includes invoking location circuitry in the computing device during the monitoring and receiving from the circuitry in response to the invocation, a geolocation of the electric vehicle. The method further includes querying a database with the geolocation of the electric vehicle and receiving in response to the querying in the memory of the computing device, an identified charging station within geographic proximity of the geolocation of the electric vehicle.

Even further, the method includes retrieving from a database of scheduled routings for the electric vehicle, a route scheduled for the electric vehicle after the contemporaneously scheduled route. Even yet further, the method includes computing a threshold charge requisite to complete both the contemporaneously scheduled route and also at least a portion of the route scheduled after the contemporaneously scheduled route. Finally, the method includes responding to a determination that the monitored charge on the battery is below the threshold level by displaying an alert in a display of the computing device to charge the battery at the identified charging station.

In one aspect of the embodiment, the threshold charge is a charging level on the battery sufficient to provide enough range of the electric vehicle to travel from the identified charging station to a completion of the route scheduled after the contemporaneously scheduled route. In another aspect of the embodiment, the threshold charge is determined by computing a range for the electric vehicle when the battery is fully charged, determining a position on the route scheduled after the contemporaneously scheduled route, the position corresponding to the computed range measured from the identified charging station, locating an additional charging station along the route scheduled after the contemporaneously scheduled route nearest to the determined position and in between the determined position and the identified charging station, computing a charging level of the battery sufficient to reach the additional charging station and, equating the threshold charge according to the charging level.

In another aspect of the embodiment, the method additionally includes responding to the receipt through the display of an affirmation of an intent to charge the battery at the identified charging station, by marking a particular outlet at the identified charging station as reserved for the electric vehicle and prohibiting other electric vehicles from utilizing the particular outlet within a calculated timeframe. Optionally, the method also includes computing an estimated time of arrival (ETA) of the electric vehicle at the identified charging station in consideration of both environmental and also traffic conditions and road limitations such as speed limits, receiving a request to utilize the particular outlet by a different vehicle, and additionally computing an estimated time to charge a battery of the different vehicle at the particular outlet. On the condition that the estimated time to charge the battery falls short of the ETA of the electric vehicle, the prohibition can be overridden.

In another embodiment of the invention, a data processing system is adapted for electric vehicle charging scheduling. The system includes a host computing platform that includes one or more computers, each with memory and one or more processing units including one or more processing cores. The system also includes a charging scheduling module. The module includes computer program instructions enabled while executing in the memory of at least one of the processing units of the host computing platform to receive over a communications channel in the memory, repeated sensor readings of a battery of an electric vehicle, the sensor readings monitoring a charge of the battery while the electric vehicle proceeds along a contemporaneously scheduled route. The program instructions also are enabled to invoke location circuitry in the host computing platform during the monitoring and to receive from the circuitry in response to the invocation, a geolocation of the electric vehicle.

The program instructions further are enabled during execution in the memory to query a database with the geolocation of the electric vehicle and to receive in response to the query, an identified charging station within geographic proximity of the geolocation of the electric vehicle. The program instructions yet further are enabled to retrieve from a data store into the memory of a computing device, from a database of scheduled routings for the electric vehicle, a route scheduled for the electric vehicle after the contemporaneously scheduled route. Finally, the program instructions are enabled to compute a threshold charge requisite to complete the contemporaneously scheduled route and to complete at least a portion of the route scheduled after the contemporaneously scheduled route and to respond to a determination that the monitored charge on the battery is below the threshold level, by displaying an alert in a display of the host computing platform to charge the battery at the identified charging station.

In yet another embodiment of the invention, a computing device is provided which includes a non-transitory computer readable storage medium having program instructions stored therein, the instructions being executable by at least one processing core of a processing unit to cause the processing unit to perform a method for electric vehicle charging scheduling. The method includes the receipt over a communications channel in memory of the computing device, of repeated sensor readings of a battery of an electric vehicle, with the sensor readings monitoring a charge of the battery while the electric vehicle proceeds along a contemporaneously scheduled route. The method also includes the invocation of location circuitry in the computing device during the monitoring and the receipt from the circuitry in response to the invocation, of a geolocation of the electric vehicle.

The method yet further includes querying a database with the geolocation of the electric vehicle and receiving in response to the querying in the memory of the computing device, an identified charging station, having one or more reservable electric power distribution outlets at which an electric vehicle may be charged, within geographic proximity of the geolocation of the electric vehicle and the retrieval from a data store into the memory of the computing device, from a database of scheduled routings for the electric vehicle, of a route scheduled for the electric vehicle after the contemporaneously scheduled route. Finally, the method includes computing a threshold charge requisite to complete the contemporaneously scheduled route and to complete at least a portion of the route scheduled after the contemporaneously scheduled route, and the response to a determination that the monitored charge on the battery is below the threshold level, by displaying an alert in a display of the computing device to charge the battery at the identified charging station.

In this way, the technical deficiencies of the determination of whether or not to charge a battery of an electric vehicle are overcome owing to the dual measurement of a contemporaneous charge of a battery and a resultant range of the vehicle, and the determination whether or not the resultant range is sufficient to power the vehicle to a specified location on a subsequently planned route for the vehicle without the need to recharge. Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for electric vehicle charging scheduling. In accordance with an embodiment of the invention, a location of an electric vehicle as the vehicle traverses a contemporaneous route can be determined in response to the detection of a charging station proximate to the vehicle along the contemporaneous route. A subsequently scheduled route is then determined and a waypoint along the scheduled route, selected, for instance a destination of the scheduled route, a known stop along the schedule route, or a known charging station along the scheduled route. Then, a current charging level of the battery of the vehicle can be ascertained so as to compute a range of the vehicle and to determine if the range is sufficient to reach the waypoint without discharging the battery below a threshold setting.

If not, the driver of the vehicle can be prompted within a display of the vehicle to fully charge the battery at the detected charging station and a charging position at the detected charging station can be reserved for use by the vehicle within a time frame consistent with a distance between the determined location of the vehicle and a location of the detected charging station. In this way, the determination of whether or not to charge at a nearest charging station along a route can be automatically and dynamically determined considering different parameters such as the percentage of the battery that is charged, the distance over which the vehicle is scheduled to travel, the geolocation of charging stations in the electrical grid, the reservations and priority queue of a charging station, and the charging time required to charge the battery, to name a few examples.

Figure 1:
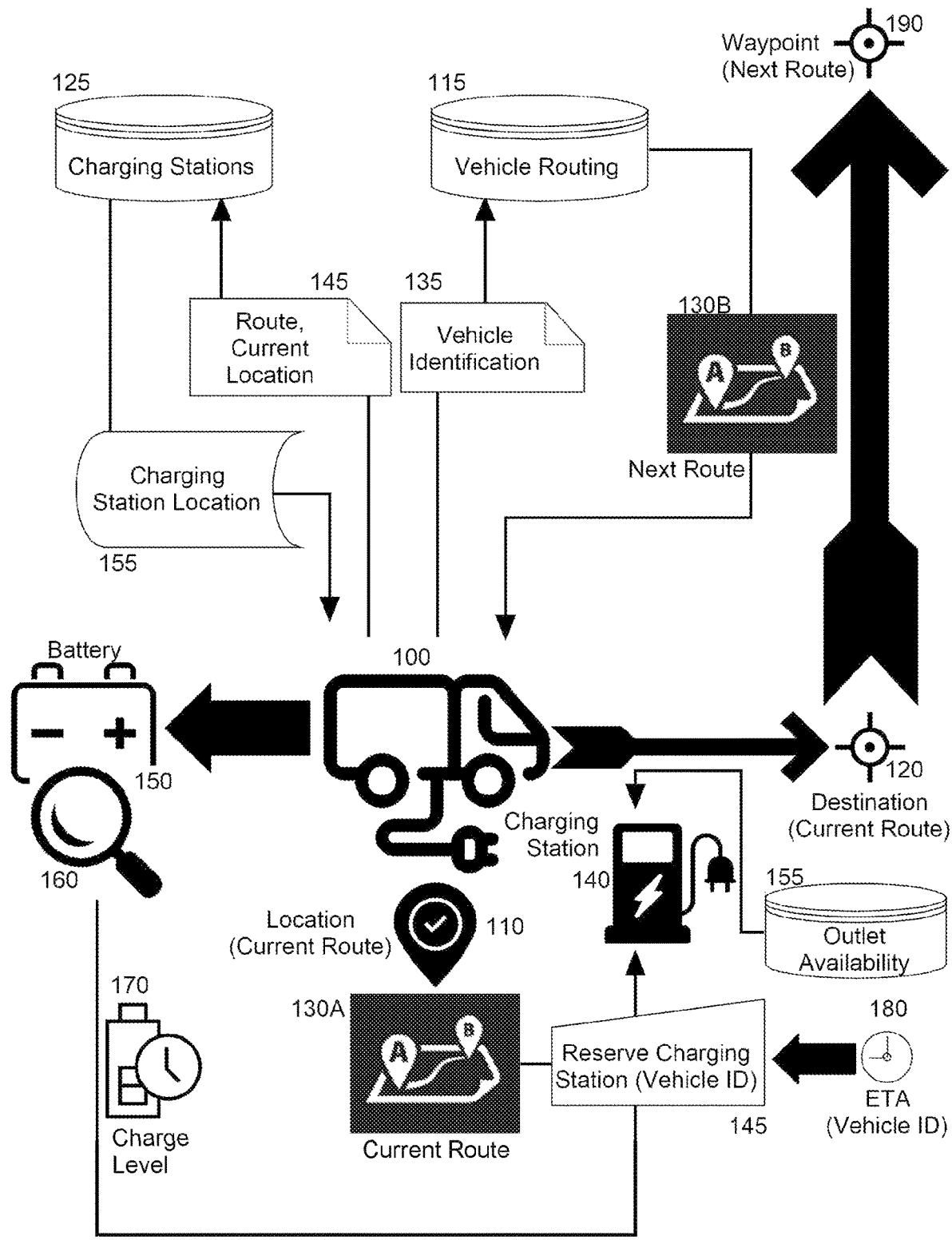
FIG. 1 is a pictorial illustration reflecting different aspects of a process of electric vehicle charging scheduling.

In illustration of one aspect of the embodiment, FIG. 1 pictorially shows a process of electric vehicle charging scheduling. As shown in FIG. 1, an electric vehicle 100 traverses a current route 130A along which a charging station 140 is detected in proximity to the electric vehicle 100. In response to detecting the charging station 140, a battery monitor 160 reports a charging level 170 of a battery 150 of the electric vehicle 100. A range is then computed for the electric vehicle 100. Concurrently, a vehicle routing data store 115 receives a query 135 from the electric vehicle 100 including an identifier of the electric vehicle 100. The vehicle routing data store 115 returns a next scheduled route 130B for the identifier of the electric vehicle 100.

A query 145 including the next scheduled route 130B and a current location 110 of the electric vehicle 100 is then provided to a charging station data store 125 in order to retrieve a location of an electric charging station 155 along the next scheduled route 130B proximate to the waypoint 190. Based upon the computed range, it is determined if the charging level 170 of the battery 150 of the electric vehicle 100 is sufficient to either complete the current route 130A to the destination 120 of the current route 130A, and to reach the waypoint 190 without discharging the battery 150 below a specified level, or whether the electric vehicle 100 is able to at least reach the location of the electric charging station 155 along the next scheduled route 130B. If not, an alert is presented in the electric vehicle 100 recommending navigation to the detected charging station 140.

In response to an acknowledgement of the alert, a message then is transmitted to the detected electric charging station 140 including a computed estimated time of arrival (ETA) 180 based upon the current location 110 so that the electric charging station 140 consults an electrical charging outlet availability database 155 to identify an available charging position at which the electric vehicle 100 may charge the battery 150 at the ETA 180 and the electrical charging station 140 reserves the identified charging position at the detected charging station 140 for use by the electric vehicle 100 at a time corresponding to the ETA 180. Optionally, to the extent that the ETA 180 permits interim use of the reserved charging position, the reserved charging position may be released for charging a different electric vehicle during a period of time between the time of receipt of the message and the time corresponding to the ETA 180 when the electric vehicle 100 is expected to arrive at the detected charging station 140.

Figure 2:
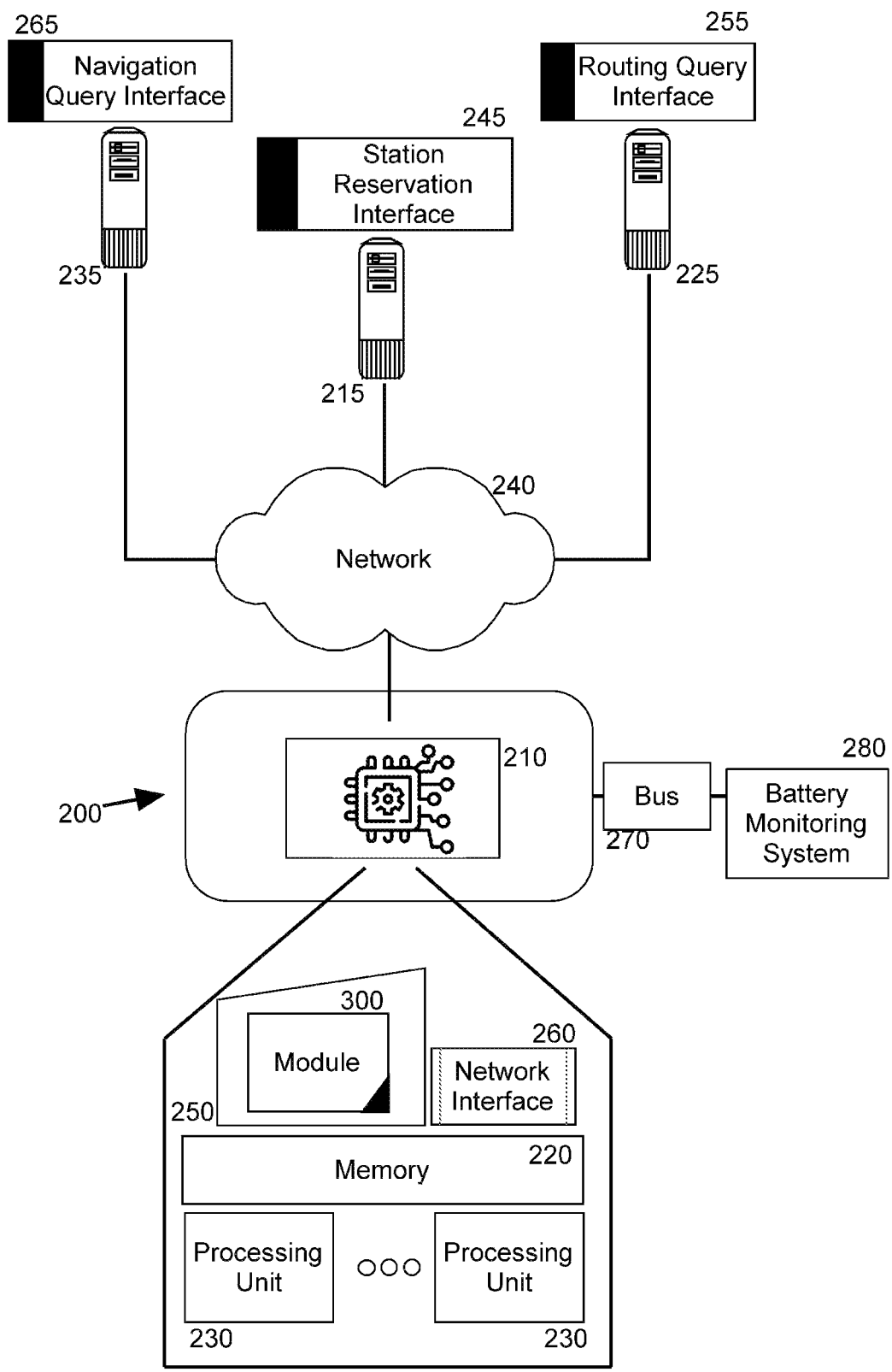
FIG. 2 is a block diagram depicting a data processing system adapted to perform one of the aspects of the process of FIG. 1; and, FIG. 3 is a flow chart illustrating one of the aspects of the process of FIG. 1.

Aspects of the process described in connection with FIG. 1 can be implemented within a data processing system. In further illustration, FIG. 2 schematically shows a data processing system adapted to perform electric vehicle charging scheduling. In the data processing system illustrated in FIG. 1, a host computing platform 200 is provided in an electric vehicle (not shown). The host computing platform 200 includes one or more embedded computing systems 210, each with memory 220 and one or more processing units 230. The embedded computing systems 210 of the host computing platform (only a single device shown for the purpose of illustrative simplicity) can be co-located within one another and in communication with one another over a local area network, or over a data communications bus 270, or the embedded computing systems 210 can be remotely disposed from one another and in communication with one another through network interface 260 over a data communications network 240.

Notably, a computing device 250 including a non-transitory computer readable storage medium can be included with the data processing system 200 and accessed by the processing units 230 of one or more of the embedded computing systems 210. The computing device 250 stores thereon or retains therein a program module 300 that includes computer program instructions which when executed by one or more of the processing units 230, performs a programmatically executable process for electric vehicle charging scheduling. Specifically, the program instructions during execution receive from battery monitoring system 280 through bus 270, battery charging level data. In response to a determination that the charging level falls below a threshold level, a location of the electrical vehicle can be determined through direct position estimation from a global positioning system. Then, the program instructions query a navigation query interface 265 in a remote server 235 to identify a next proximate charging station along a current route followed by the electric vehicle.

Once the next proximate charging station has been identified, the program instructions query a routing query interface 255 in server 225 in order to retrieve a next scheduled route for the electric vehicle. The program instructions then select a waypoint along the next scheduled route and compare a range for the electric vehicle determined from the charging level reported by the battery monitoring system 280, to a distance from the current location of the electric vehicle to the waypoint. To the extent that the range is determined to be sufficient to complete the current route and to reach the waypoint, no further action is required. However, to the extent that the range is determined to be insufficient to complete the current route and to reach the waypoint, the program instructions present a prompt in the electric vehicle to reserve a charging position at the next proximate charging station. The program instructions then access a reservation interface 245 in a server 215 associated with the next proximate charging station in order to reserve a charging position for the electric vehicle before the electric vehicle arrives at the next proximate charging station.

Figure 3:
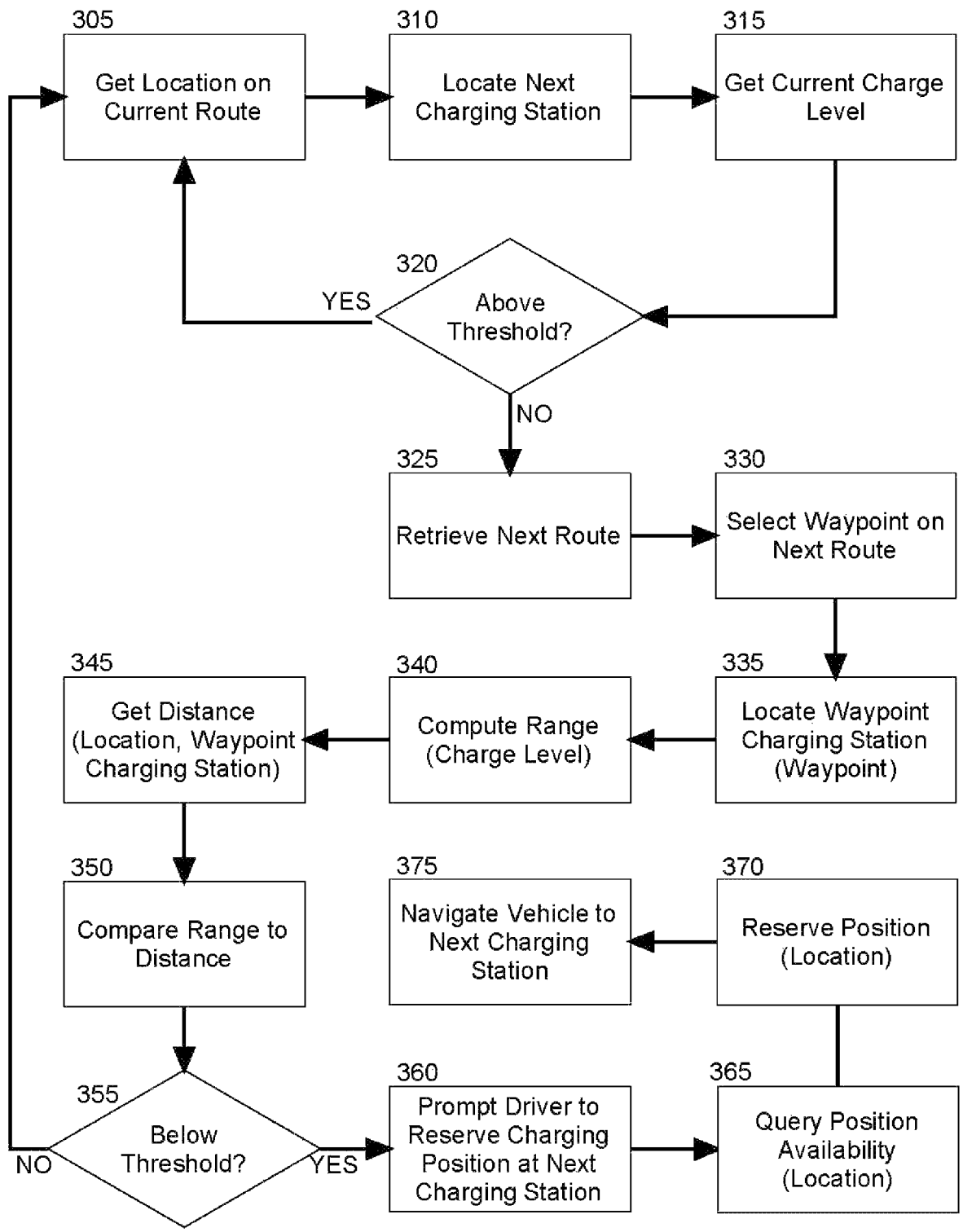

In further illustration of an exemplary operation of the module 300 in FIG. 2, FIG. 3 is a flow chart illustrating one of the aspects of the process of FIG. 1. Beginning in block 305, a location of an electric vehicle is determined, for instance by querying positioning circuitry. In block 310, a next charging station along a contemporaneous route taken by the electric vehicle is determined. As well, in block 315, a current charging level of a battery of the electric vehicle is determined. Then, in decision block 320, it is determined whether or not the current charging level is above a threshold level. If so, the process returns to block 305. But otherwise, the process continues to block 325.

In block 325, a next route schedule for the electric vehicle is retrieved and in block 330, a waypoint on the next route is selected. Then, in block 335, a charging station proximate to the waypoint is located by querying a navigation system. In block 340, a range is computed for the electric vehicle based upon the charging level of the battery and in block 345, a total distance from the location of the electric vehicle to charging station proximate to the waypoint is determined.

Thereafter, in block 350 the range is compared to the distance. To the extent in decision block 355 the comparison produces a difference greater than a threshold, it is presumed that ample charge exists on the battery and the process returns to block 305. But otherwise, the process continues to block 360.

In block 360, it is presumed that the charging level of the battery of the electric vehicle is not sufficient to reach the charging station proximate to the waypoint. In that instance a prompt is provided in the electric vehicle prompting the operator of the electric vehicle to recharge the battery at the next charging station along the contemporaneous route. Upon receiving an affirmation from the operator of the electric vehicle, in block 365 an availability data store at the next charging station is queried to identify an available charging position at which the electric vehicle may receive charging and upon identifying the available charging position, in block 370 a message is transmitted to the next charging station reserving the available charging position at the next charging station. Finally, in block 375, the navigation system provides turn-by-turn directions to the next charging station.

Of import, the foregoing flowchart and block diagram referred to herein illustrate the architecture, functionality, and operation of possible implementations of systems, methods, and computing devices according to various embodiments of the present invention. In this regard, each block in the flowchart or block diagrams may represent a module, segment, or portion of instructions, which includes one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

More specifically, the present invention may be embodied as a programmatically executable process. As well, the present invention may be embodied within a computing device upon which programmatic instructions are stored and from which the programmatic instructions are enabled to be loaded into memory of a data processing system and executed therefrom in order to perform the foregoing programmatically executable process. Even further, the present invention may be embodied within a data processing system adapted to load the programmatic instructions from a computing device and to then execute the programmatic instructions in order to perform the foregoing programmatically executable process.

To that end, the computing device is a non-transitory computer readable storage medium or media retaining therein or storing thereon computer readable program instructions. These instructions, when executed from memory by one or more processing units of a data processing system, cause the processing units to perform different programmatic processes exemplary of different aspects of the programmatically executable process. In this regard, the processing units each include an instruction execution device such as a central processing unit or "CPU" of a computer. One or more computers may be included within the data processing system. Of note, while the CPU can be a single core CPU, it will be understood that multiple CPU cores can operate within the CPU and in either instance, the instructions are directly loaded from memory into one or more of the cores of one or more of the CPUs for execution.

Aside from the direct loading of the instructions from memory for execution by one or more cores of a CPU or multiple CPUs, the computer readable program instructions described herein alternatively can be retrieved from over a computer communications network into the memory of a computer of the data processing system for execution therein. As well, only a portion of the program instructions may be retrieved into the memory from over the computer communications network, while other portions may be loaded from persistent storage of the computer. Even further, only a portion of the program instructions may execute by one or more processing cores of one or more CPUs of one of the computers of the data processing system, while other portions may cooperatively execute within a different computer of the data processing system that is either co-located with the computer or positioned remotely from the computer over the computer communications network with results of the computing by both computers shared therebetween.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. An electric vehicle charging scheduling method comprising:

receiving over a communications channel, into memory of a computing device, repeated sensor readings of a battery of an electric vehicle, the sensor readings monitoring a charge of the battery while the electric vehicle proceeds along a contemporaneously scheduled route;

invoking location circuitry in the computing device during the monitoring, and receiving from the location circuitry in response to the invocation, a geolocation of the electric vehicle;

querying a database with the geolocation of the electric vehicle, and receiving in response to the querying into the memory of the computing device, an identified charging station determined to be within geographic proximity of the geolocation of the electric vehicle;

retrieving from a data store into the memory of a computing device, from a database of scheduled routings for the electric vehicle, a route scheduled for the electric vehicle after the contemporaneously scheduled route;

computing by a processing unit of a processor of the computing device a threshold charge requisite to complete the contemporaneously scheduled route and to complete at least a portion of the route scheduled after the contemporaneously scheduled route; and, responsive to a determination that the monitored charge on the battery is below a level of the threshold charge, displaying an alert in a display of the computing device to charge the battery at the identified charging station.

2. The method of claim 1, wherein the threshold charge is a charging level on the battery sufficient to provide enough range of the electric vehicle to travel from the identified charging station to a completion of the route scheduled after the contemporaneously scheduled route.

3. The method of claim 1, wherein the threshold charge is determined by:
   computing a range for the electric vehicle when the battery is fully charged;
   determining a position on the route scheduled after the contemporaneously scheduled route, the position corresponding to the computed range measured from the identified charging station;
   locating an additional charging station along the route scheduled after the contemporaneously scheduled route nearest to the determined position and in between the determined position and the identified charging station;
   computing a charging level of the battery sufficient to reach the additional charging station; and,
   equating the threshold charge according to the charging level.

4. The method of claim 1, further comprising, responsive to receiving through the display an affirmation of an intent to charge the battery at the identified charging station, communicating with a computing device at the identified charging station over a computer communications network to direct the marking of a particular outlet at the identified charging station as reserved for the electric vehicle and to direct the prohibiting of other electric vehicles from utilizing the particular outlet.

5. The method of claim 4, further comprising computing an estimated time of arrival (ETA) of the electric vehicle at the identified charging station, receiving a request to utilize the particular outlet by a different vehicle, additionally computing an estimated time to charge a battery of the different vehicle at the particular outlet and, on condition that the estimated time to charge the battery falls short of the ETA of the electric vehicle, overriding the prohibition.

6. A data processing system adapted for electric vehicle charging scheduling, the system comprising:
   a host computing platform comprising one or more computers, each with memory and one or more processing units including one or more processing cores; and,
   a charging scheduling module comprising computer program instructions enabled while executing in the memory of at least one of the processing units of the host computing platform to perform:
      receiving over a communications channel in the memory, repeated sensor readings of a battery of an electric vehicle, the sensor readings monitoring a charge of the battery while the electric vehicle proceeds along a contemporaneously scheduled route;
      invoking location circuitry in the host computing platform during the monitoring and receiving from the location circuitry in response to the invocation, a geolocation of the electric vehicle;
      querying a database with the geolocation of the electric vehicle and receiving in response to the querying of the database, into the memory of the computing device, an identified charging station determined to be within geographic proximity of the geolocation of the electric vehicle;
      retrieving from a data store into the memory of the host computing platform, from a database of scheduled routings for the electric vehicle, a route scheduled for the electric vehicle after the contemporaneously scheduled route;
      computing a threshold charge requisite to complete the contemporaneously scheduled route and to complete at least a portion of the route scheduled after the contemporaneously scheduled route; and,
      responsive to a determination that the monitored charge on the battery is below a level of the threshold charge, displaying an alert in a display of the host computing platform to charge the battery at the identified charging station.

7. The system of claim 6, wherein the threshold charge is a charging level on the battery sufficient to provide enough range of the electric vehicle to travel from the identified charging station to a completion of the route scheduled after the contemporaneously scheduled route.

8. The system of claim 6, wherein the threshold charge is determined by:
   computing a range for the electric vehicle when the battery is fully charged;
   determining a position on the route scheduled after the contemporaneously scheduled route, the position corresponding to the computed range measured from the identified charging station;
   locating an additional charging station along the route scheduled after the contemporaneously scheduled route nearest to the determined position and in between the determined position and the identified charging station;
   computing a charging level of the battery sufficient to reach the additional charging station; and,
   equating the threshold charge according to the charging level.

9. The system of claim 6, wherein the program instructions are enabled while executing in the memory of at least one of the processing units of the host computing platform to further perform, responsive to receiving through the display an affirmation of an intent to charge the battery at the identified charging station, communicating with a computing device at the identified charging station over a computer communications network to direct the marking of a particular outlet at the identified charging station as reserved for the electric vehicle and to direct the prohibiting of other electric vehicles from utilizing the particular outlet.

10. The system of claim 9, wherein the program instructions are enabled while executing in the memory of at least one of the processing units of the host computing platform to yet further perform, computing an estimated time of arrival (ETA) of the electric vehicle at the identified charging station, receiving a request to utilize the particular outlet by a different vehicle, additionally computing an estimated time to charge a battery of the different vehicle at the particular outlet and, on condition that the estimated time to charge the battery falls short of the ETA of the electric vehicle, overriding the prohibition.

11. A computing device comprising a non-transitory computer readable storage medium having program instructions stored therein, the instructions being executable by at least one processing core of a processing unit to cause the processing unit to perform a method for electric vehicle charging scheduling, the method including:

receiving over a communications channel in memory of the computing device, repeated sensor readings of a battery of an electric vehicle, the sensor readings monitoring a charge of the battery while the electric vehicle proceeds along a contemporaneously scheduled route;

invoking location circuitry in the computing device during the monitoring and receiving from the location circuitry in response to the invocation, a geolocation of the electric vehicle;

querying a database with the geolocation and receiving in response to the querying an identified charging station determined to be within geographic proximity of the geolocation of the electric vehicle;

retrieving from a data store into the memory of the computing device, from a database of scheduled routings for the electric vehicle, a route scheduled for the electric vehicle after the contemporaneously scheduled route;

computing by the at least one processing core a threshold charge requisite to complete the contemporaneously scheduled route and to complete at least a portion of the route scheduled after the contemporaneously scheduled route; and, responsive to a determination that the monitored charge on the battery is below a level of the threshold charge, displaying an alert in a display of the computing device to charge the battery at the identified charging station.

12. The computing device of claim 11, wherein the threshold charge is a charging level on the battery sufficient to provide enough range of the electric vehicle to travel from the identified charging station to a completion of the route scheduled after the contemporaneously scheduled route.

13. The computing device of claim 11, wherein the threshold charge is determined by:

computing a range for the electric vehicle when the battery is fully charged;

determining a position on the route scheduled after the contemporaneously scheduled route, the position corresponding to the computed range measured from the identified charging station;

locating an additional charging station along the route scheduled after the contemporaneously scheduled route nearest to the determined position and in between the determined position and the identified charging station;

computing a charging level of the battery sufficient to reach the additional charging station; and, equating the threshold charge according to the charging level.

14. The computing device of claim 11, wherein the method further comprises, responsive to receiving through the display an affirmation of an intent to charge the battery at the identified charging station, communicating with a computing device at the identified charging station over a computer communications network to direct the marking of a particular outlet at the identified charging station as reserved for the electric vehicle and to direct the prohibiting of other electric vehicles from utilizing the particular outlet.

15. The computing device of claim 14, wherein the method further comprises, computing an estimated time of arrival (ETA) of the electric vehicle at the identified charging station, receiving a request to utilize the particular outlet by a different vehicle, additionally computing an estimated time to charge a battery of the different vehicle at the particular outlet and, on condition that the estimated time to charge the battery falls short of the ETA of the electric vehicle, overriding the prohibition.

* * * * *